United States Patent
Kim et al.

[11] Patent Number: 5,712,927
[45] Date of Patent: Jan. 27, 1998

[54] METHOD AND APPARATUS FOR BINARY-ENCODING IMAGE DATA USING ERROR DIFFUSION WITH EDGE ENHANCEMENT

[75] Inventors: Jae-Ho Kim; Tae-Il Chung; Kyung-Sik Son; Hyung-Soon Kim, all of Busan, Rep. of Korea

[73] Assignee: SamSung Electronics Co., Ltd., Suwon, Rep. of Korea

[21] Appl. No.: 502,413

[22] Filed: Jul. 14, 1995

[30] Foreign Application Priority Data

Jul. 14, 1994 [KR] Rep. of Korea ......... 1994/17002
Jun. 22, 1995 [KR] Rep. of Korea ......... 1995/16949

[51] Int. Cl.$^6$ ......................................... G06K 9/36
[52] U.S. Cl. ............................... 382/252; 382/270
[58] Field of Search ........................... 382/251, 252, 382/270, 274; 398/465, 466

[56] References Cited

U.S. PATENT DOCUMENTS

| | | | |
|---|---|---|---|
| 5,045,952 | 9/1991 | Eschbach | 358/447 |
| 5,051,844 | 9/1991 | Sullivan | 358/455 |
| 5,245,678 | 9/1993 | Eschbach et al. | 382/252 |
| 5,257,116 | 10/1993 | Suzuki | 382/199 |
| 5,268,774 | 12/1993 | Eschbach | 358/466 |
| 5,293,579 | 3/1994 | Stockholm | 382/269 |
| 5,299,308 | 3/1994 | Suzuki et al. | 395/523 |
| 5,307,425 | 4/1994 | Otsuka | 382/252 |
| 5,313,287 | 5/1994 | Barton | 358/458 |
| 5,317,653 | 5/1994 | Eschbach et al. | 382/252 |
| 5,325,211 | 6/1994 | Eschbach | 358/466 |
| 5,337,160 | 8/1994 | Jones | 358/447 |
| 5,374,997 | 12/1994 | Eschbach | 358/466 |
| 5,386,509 | 1/1995 | Suzuki et al. | 395/523 |
| 5,488,673 | 1/1996 | Katayama et al. | 382/270 |

OTHER PUBLICATIONS

.Error–diffusion algorithm with edge enhancement. by R. Eschbach and K.T. Knox. *The Journal of Optical Society of America A.* vol. 8, No. 12, Dec. 1991.

*Primary Examiner*—Yon J. Couso
*Attorney, Agent, or Firm*—R.B. Bushnell, Esq.

[57] ABSTRACT

An image processing system for displaying pixel data on a screen performs a binary-encoding method using error diffusion with edge enhancement. In the method for binary-encoding the image data, pixels to be binary-encoded are divided into normal and edge regions, and the pixel data is binary-encoded in accordance with the divided regions. By using the method, bars on the display screen which are unpleasant to the eye can be removed and an image with good edge sharpness can be obtained.

22 Claims, 7 Drawing Sheets

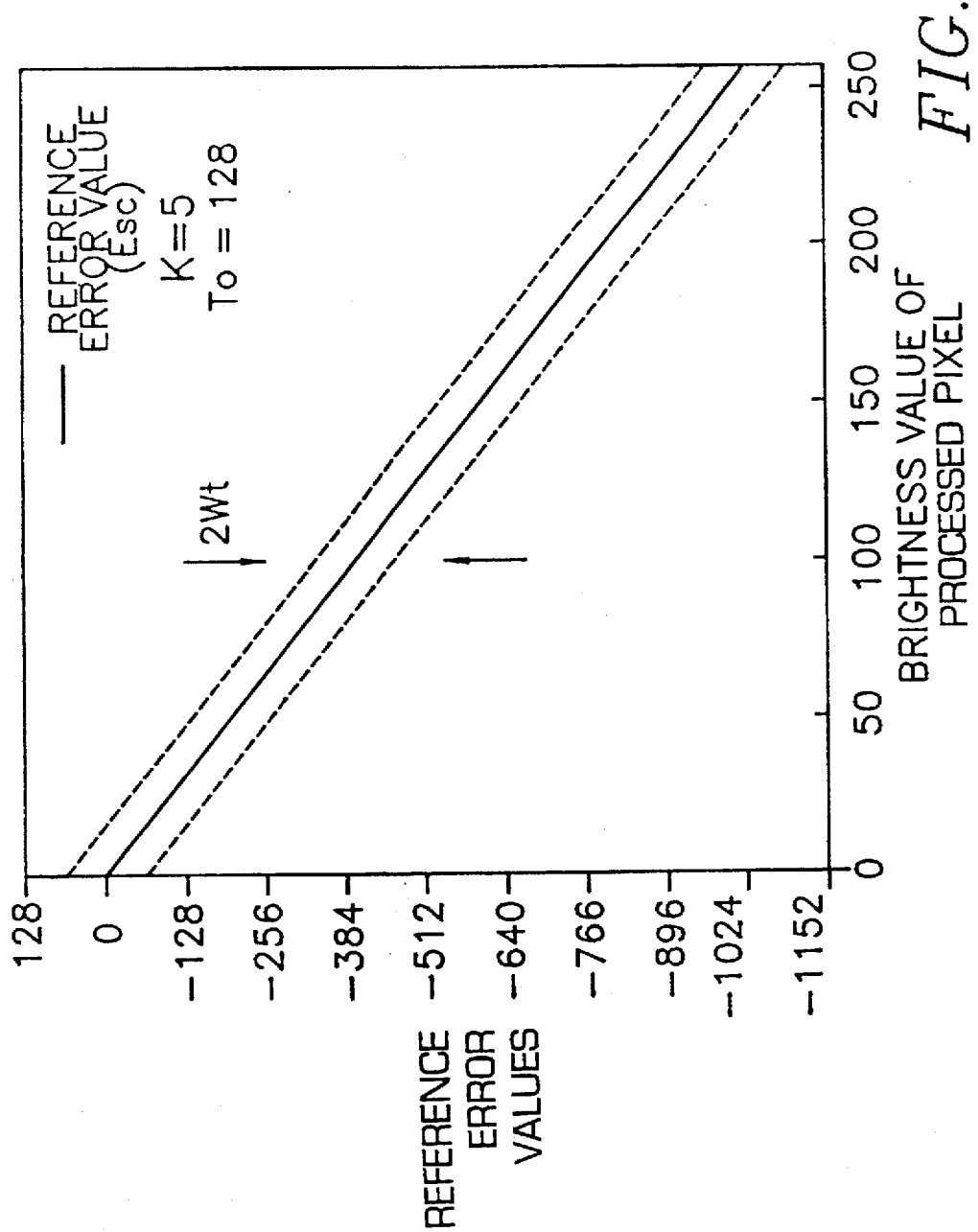

METHOD AND APPARATUS FOR BINARY-ENCODING IMAGE DATA USING ERROR DIFFUSION WITH EDGE ENHANCEMENT

CROSS REFERENCE TO RELATED APPLICATIONS

This application makes reference to, incorporates the same herein, and claims all benefits accruing under 35 U.S.C. §119 from applications for Method And Apparatus For Binary-Encoding Image Data Using Error Diffusion With Edge Enhancement earlier filed in the Korean Industrial Property Office on 14 Jul. 1994 and 22 Jun. 1995 and assigned Ser. Nos. 17002/1994 and 16949/1995, respectively.

BACKGROUND OF THE INVENTION

The present invention relates to an image processing system for representing digital image data as binary code, and more particularly to a method and an apparatus for binary-encoding image data using error diffusion and edge enhancement.

Binary-encoding techniques, which are used to represent image data as binary code, for example white (logic level "0" or "1") or black (logic level "1" or "0"), have been widely used in facsimiles, liquid crystal displays (LCDs), laser printers, color printers, digital duplicating apparatuses, and the like. With such binary-encoding techniques, error diffusion has been widely used in recent years. With error diffusion, errors in brightness values from pixels to be binary-encoded are distributed to adjacent pixels. Thereby, errors in the brightness values of contiguous pixels to be binary-encoded as white or black are compensated. With the binary-encoding method, since an average error in brightness value is minimized by providing errors in brightness values to adjacent pixels, an intermediate greyscale value can be accurately represented and excellent edge sharpness can be obtained. Binary-encoding methods, however, often have a disadvantage in that a large number of calculations are required. They are, however, advantageous in that they provide excellent image quality. With the recent development in processors, the binary-encoding technique is widely used to convert image data into binary code.

Hereinafter, prior art binary-encoding techniques using an error diffusion algorithm will be briefly described.

If $I(x,y)$ defines the brightness value of a pixel at a point $(x,y)$ in a coordinate system, each error value $E(x',y')$ of adjacent points can be diffused. Accordingly, a modified brightness value $I_c(x,y)$ is also defined as an error diffusion value and can be expressed by the following expression (1):

$$I_c(x,y) = I(x,y) + \frac{\sum_{ij} a_{ij} E(x - i\Delta x, y - j\Delta y)}{\sum_{ij} a_{ij}} \quad (1)$$

In the expression (1) above, $a_{ij}$ is defined as an error filter "A" and can be expressed by the following expression (2):

$$A = \begin{vmatrix} - & * & a_{01} \\ a_{-11} & a_{01} & a_{11} \end{vmatrix} = \begin{vmatrix} - & * & 7 \\ 3 & 5 & 1 \end{vmatrix} \quad (2)$$

As to the error filter "A", several modified filters have been disclosed after the enhanced error diffusion method proposed by Floyd, but it is our belief that none provide a sufficient degree of efficiency. Because the expression (1) above can be readily implemented into hardware, it is frequently used. Also, the error filter of expression (2) is used as one of the error filters embodied in the present invention.

If the modified brightness value is represented as $I_c(x,y)$, binary-encoded output $O_b(x,y)$ and error value $E(x,y)$ of respective pixels can be expressed by the following expressions (3) and (4).

$$O_b(x,y) = \theta[I_c(x,y) - T_0] = \begin{pmatrix} 255(\text{white}), \text{ when } I_c > T_0 \\ 0(\text{black}), \text{ when } I_c < T_0 \end{pmatrix} \quad (3)$$

$$\theta[\beta]: \text{binary-encoding function} = \begin{pmatrix} \text{white, when } \beta > 0 \\ \text{black, when } \beta < 0 \end{pmatrix} \quad (3\text{-}1)$$

$$E(x,y) = I_c(x,y) - O_b(x,y) \quad (4)$$

From expression (3) above, it is seen that a constant threshold value $T_0$ for binary-encoding is initially set to an intermediate value between black (i.e. "0") and white (i.e. "255"), and thereafter, an output of the binary encoded image is not affected even if the threshold value $T_0$ is not equal to the intermediate value. There has been a new attempt to improve image quality by an error diffusion method using a periodically varying threshold for the position of each pixel. We, however, believe that the prior art methods can be improved upon by taking edge regions of an image into consideration in the binary-encoding process.

SUMMARY OF THE INVENTION

Accordingly, it is an object of the present invention to provide an improved method and apparatus for binary-encoding image data using error diffusion with edge enhancement.

It is another object to provide a method and apparatus for binary-encoding image data using error diffusion with edge enhancement, in which a plurality of pixels to be binary-encoded is divided into a normal region and an edge region and binary-encoded regardless of an increase and/or decrease in the edge enhancement coefficient.

It is still another object to provide a method and apparatus for binary-encoding image data using error diffusion with edge enhancement, in which dependency on brightness values of pixel data can be restrained to perform edge enhancement.

It is yet another object to provide a method and apparatus for binary-encoding image data using error diffusion with edge enhancement, in which a plurality of pixels to be binary-encoded is divided into a normal region and an edge region and binary-encoded regardless of an increase and/or decrease in the edge enhancement coefficient, and in which the magnitude of an error value is symmetrical with respect to zero.

It is still yet another object to remove bars from images in a visual display while enhancing edge sharpness of the images provided.

These and other objects can be achieved with an image processing system for binary-encoding image data representing a plurality of pixels, wherein each pixel has a brightness value corresponding to a given level, and the system has a memory for storing error values of previous pixels obtained in previous steps. The system performs a method for binary-encoding the image data by multiplying the error values by corresponding respective error filter coefficients to generate multiplied values, adding the multiplied values to generate an error value, and adding a brightness value of a pixel being processed to the error value to generate modified image data. A modified brightness value corresponding to a predetermined edge enhancement coefficient on the basis of the brightness of the processed pixel is then determined and the modified brightness value is subtracted from a predetermined reference threshold value to generate a modified threshold value. The modified image data is compared with the modified threshold value to obtain a binary-encoded value for the processed pixel in accordance with the comparison result and a determination is made of whether the processed pixel is within an edge region on the basis of the brightness value of the processed pixel and the error value. The binary-encoded value is subtracted from the modified image data when the processed pixel is not within an edge region and the subtracted value is stored in the memory as an error value of the processed pixel. An addition or subtraction operation is performed on a predetermined error parameter and the error value based on the binary-encoded value when the processed pixel is within an edge region in order to store a calculated value in the memory as the error value of the processed pixel.

According to another aspect of the present invention, an image processing system is provided for binary-encoding image data representing a plurality of pixels, wherein each pixel has a brightness value corresponding to a given level. The system has a memory for storing error values of previous pixels obtained in previous steps, and performs a method for binary-encoding the image data by a process of multiplying the error values by corresponding respective error filter coefficients to generate multiplied values, adding the multiplied values to generate an error value, and adding a brightness value of a pixel being processed to the error value to generate modified image data; determining a modified brightness value corresponding to a predetermined edge enhancement coefficient on the basis of the brightness of the processed pixel, multiplying the modified brightness value by a corresponding edge enhancement coefficient to generate a multiplied brightness value, and subtracting the multiplied brightness value from a predetermined reference threshold value to generate a modified threshold value; comparing the brightness value of the processed pixel with the modified threshold value to obtain a binary-encoded value of the processed pixel in accordance with the comparison result; determining whether said processed pixel is within an edge region based on the brightness value of the processed pixel and the error value; subtracting the binary-encoded value from the modified image data when the processed pixel is not within an edge region and storing in the memory a subtracted value as an error value of the processed pixel; and performing an addition or subtraction operation on a predetermined error parameter and the error value based on the binary-encoded value when the processed pixel is within an edge region and storing in the memory a calculated value as the error value of the processed pixel.

The image processing apparatus using error diffusion according to a further aspect of the present invention contemplates a stage for receiving a brightness value of a pixel being processed and an error value generated from a previous binary-encoding step and adding the two values to generate modified image data; a stage for multiplying the brightness value by a predetermined edge enhancement coefficient to generate a modified brightness value; a stage for subtracting the modified brightness value from a reference threshold value to generate a modified threshold value; a stage for comparing the modified image data with the modified threshold value and generating a binary-encoded value based on the comparison result; a stage for detecting an edge region by determining a reference error value on the basis of the brightness value of the processed pixel and an error deviation of the error value from the reference error value, comparing the error deviation with a predetermined error range, and generating a selecting signal indicating whether the processed pixel is within an edge region in accordance with the comparison result; a stage for subtracting the binary-encoded value from the modified image data; calculating means for receiving the error value and the binary-encoded value and performing an addition or subtraction operation upon the error value and a predetermined error parameter; a selector receiving output signal from the subtracting means and the calculating means and selecting one of the output signals as an error value in response to the selecting signal; and a memory for sequentially storing error values of previously processed pixels, performing multiplication operations on all of the error values and corresponding coefficients, respectively, to generate multiplied values, and adding the multiplied values to generate the error value for a next binary-encoding step.

The image processing apparatus using error diffusion according to another aspect of the present invention contemplates circuit stages adding a brightness value of a pixel being processed and an error value generated from a previous binary-encoding step to generate modified image data; multiplying the brightness value by a predetermined edge enhancement coefficient to generate a modified brightness value; generating a modified threshold value $T_n$ equal to $KT_o - (K-1) - I$, where $T_o$ is a reference threshold value. K is an edge enhancement coefficient, and I is a brightness value of the processed pixel; comparing the modified image data and the modified threshold value to generate a binary-encoded value in accordance with the comparison result; detecting an edge region and determining a reference error value on the basis of the brightness value of the processed pixel and an error deviation of the error value from the reference error value, a comparing the error deviation with a predetermined error range, and generating a selecting signal indicating whether the processed pixel is within an edge region in accordance with the comparison result; subtracting the binary-encoded value from the modified image data; performing an addition or subtraction operation on the error value and a predetermined error parameter; selecting one of the output signals from the subtracting means and the calculating means as an error value in response to the selecting signal; and a memory sequentially storing error values of previously processed pixels, performing multiplication operations on all of the error values and corresponding coefficients, respectively, and generating multiplied values, and adding the multiplied values to generate the error value for a next binary-encoding step.

In practicing the principles of the present invention, bars on a display screen that are unpleasant to the eye can be removed and an image with good edge sharpness can be obtained.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A and 4B are two coordinate graphs showing boundary states in which the pixels of an image are divided into a normal region and an edge region by a boundary line;

DETAILED DESCRIPTION OF THE PRESENT INVENTION

Figure 1:
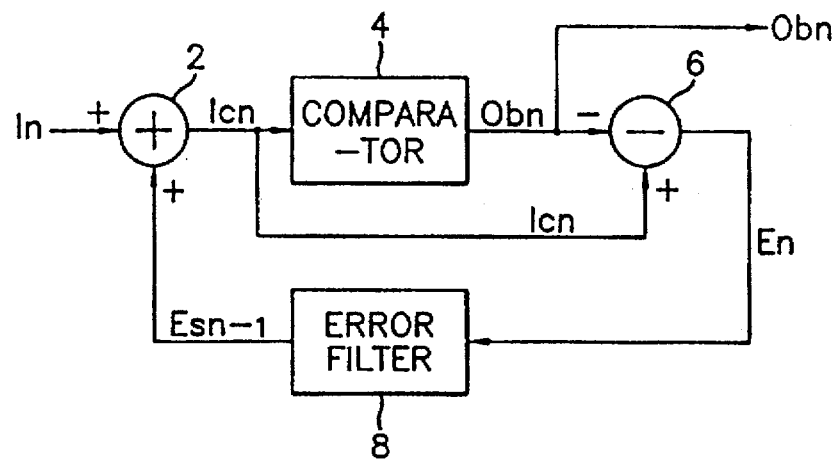
FIG. 1 is a block diagram illustrating a contemporary circuit for performing an image data binary-encoding process using an error diffusion algorithm.

Turning now to the drawings and referring to FIG. 1, a generalized block diagram of a contemporary design of a circuit for performing a binary-encoding method, which was widely used by Stevenson and Arce in 1985, is illustrated.

In FIG. 1, $I_n$ represents digital image data (i.e. the brightness value) of a pixel M, $O_{bn}$ represents an output level (i.e. a binary-encoded value) of the pixel n which is convened into an intermediate greyscale value, $E_{sn-1}$ represents an error value of a previous pixel (n−1), an $I_{cn}$ represents modified image data (or an error diffusion value). That is, $I_{cn}$ represents the sum of the digital image data $I_n$ and the error value $E_{sn-1}$ of the previous input pixel (n−1), where n is the image pixel number. The algorithm used in the circuit of FIG. 1 is discussed in *Proceeding of the IEEE*, Vol. 76, No. 1 and also in the Korean patent application, Ser. No. 92-22466, filed by the same applicant as the present invention.

The addition of the brightness value $I_n$ of the input pixel n and the error value $E_{sn-1}$ of the previous pixel (n−1) is done through an adder 2 to provide the modified image data $I_{cn}$. The modified image data $I_{cn}$ is provided as an input to a comparator 4 for comparison with a constant threshold value $T_0$. The output from comparator 4 is a binary-encoded value $O_{bn}$ of the pixel n being currently processed. The binary-encoded value $O_{bn}$ is subtracted from the modified image data $I_{cn}$ through a subtractor 6 to provide an error value $E_n$. The error value $E_n$ is then provided as an input to an error filter 8. Error filter 8 generates the error value $E_{sn-1}$ based on the computation of error values obtained from previously processed pixels and filter coefficients of the respective error values.

The circuit and method described above, however, is unable to provide adequate edge sharpness when the pixel information is binary-encoded. For this reason, an error diffusion method with edge enhancement has been developed and is discussed by R. Eschbach and K. Knox in "ERROR DIFFUSION ALGORITHM WITH EDGE ENHANCEMENT", J. Opt. Soc. Am. Vol. 8, No. 12, p. 1844–1850, 1991. This enhanced error diffusion method has the same process steps as those of the contemporary error diffusion method described in conjunction with FIG. 1, except that the brightness value of an input pixel is multiplied by a variable K in a multiplier prior to binary-encoding the pixel information. Accordingly, an edge enhanced image is provided for display on a screen.

On the other hand, in the Eschbach method, a new threshold value based on the brightness of input pixel information (i.e. a modified threshold value) can be obtained from the following expression (5):

$$T_n = T_0 - (K-1) \times I(x,y) \qquad (5)$$

where the variable K can be described as an edge enhancement coefficient since the amount of edge enhancement is determined by the value of K.

If $T_n$ is defined as the binary-encoded threshold value, the edge enhancement can be obtained by the following expression (6):

$$O_b(x,y) = \theta[I_c(x,y) - T_n] = \begin{pmatrix} 255(\text{white}), \text{ when } I_c > T_n \\ 0(\text{black}), \text{ when } I_c < T_n \end{pmatrix} \qquad (6)$$

Then, expression (4) is used as an error calculating expression. If the edge enhancement coefficient K is "1", the same binary-encoding method as the contemporary method of FIG. 1 is performed. Also, when the edge enhancement coefficient K becomes greater than "1", edge pixels are further emphasized on the basis of additional information, and thus an image can be distinctly displayed. If the edge enhancement coefficient K becomes smaller than "1", the image is indistinctly displayed.

Figure 2:
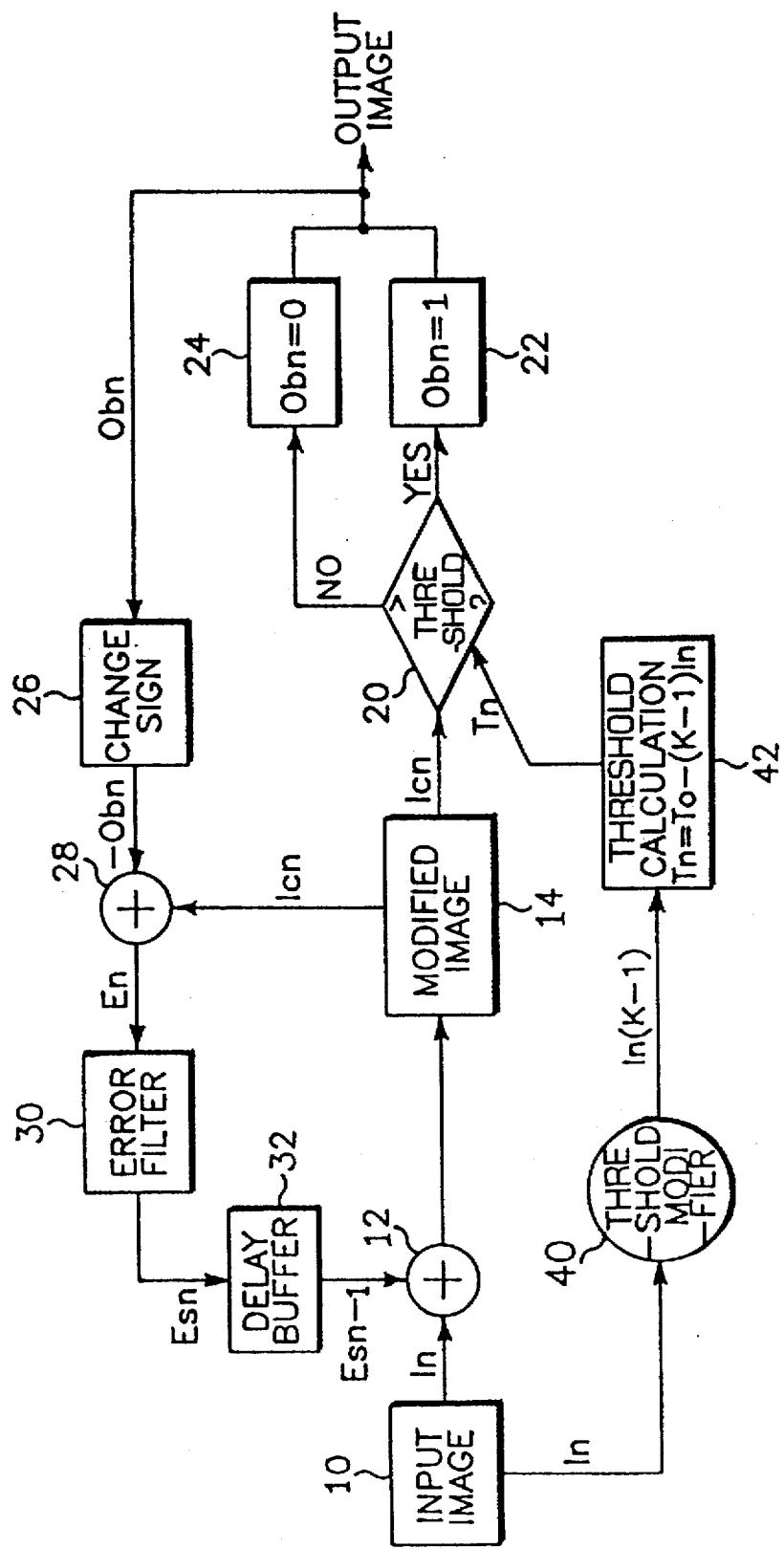
FIG. 2 is a block diagram illustrating a contemporary circuit for performing a contemporary image data binary-encoding process using an error diffusion algorithm with edge enhancement.

Referring now to FIG. 2, a structural diagram of a circuit for performing the binary-encoding method with edge enhancement, proposed by Eschbach and disclosed in U.S. Pat. No. 5,045,952, is shown.

In FIG. 2, a first adder 12 receives a brightness value $I_n$ of an input pixel n from an image input block 10 and an error value $E_{sn-1}$ (obtained from a previous step) and performs an addition operation, where n represents the input image pixel number. The output of first adder 12 is then provided to a modified image block 14. Modified image data $I_{cn}$ (i.e. error diffusion value) is then output from modified image block 14 and provided as an input to a threshold comparator 20. The brightness value $I_n$ is also multiplied by a coefficient value (K−1) in a threshold modifier 40 to generate a modified brightness value of $I_n(K-1)$. The modified brightness value $I_n(K-1)$ is then provided to a threshold calculator 42. The modified brightness value $I_n(K-1)$ is subtracted from a constant threshold value $T_0$ in threshold calculator 42 to generate a modified threshold value $T_n$. The modified threshold value $T_n$ is then applied to the other input of threshold comparator 20.

The error diffusion value $I_{cn}$ and the modified threshold value $T_n$ are compared in threshold comparator 20. If $I_{cn}$ is greater than $T_n$, a binary-encoded value $O_{bn}$ of logic level "1" is provided from threshold comparator 20, and if $I_{cn}$ is not greater than $T_n$, the binary-encoded value $O_{bn}$ of logic level "0" is provided from threshold comparator 20.

The binary-encoded value $O_{bn}$ is inverted into $-O_{bn}$ through a sign inversion block 26 and then provided to a second adder 28. The binary-encoded value $O_{bn}$ is added to the modified image data $I_{cn}$ in second adder 28 to generate an error value $E_n$ of the processed input pixel n. The error value $E_n$ is then provided to an error filter 30. In error filter 30, computations with the error value $E_n$, the error value $E_{n-1}$ obtained from the previously processed pixel (n−1), and a filter coefficient of the respective error values are performed. That is, error filter 30, in which the error value $E_{n-1}$ of the previously processed pixel (n−1) adjacent to the currently processed pixel n is stored, multiplies the error values by corresponding coefficients, to generate multiplied values, and sums the multiplied values to generate the error value $E_{sn}$ for a next binary-encoding step. Then, a delay buffer 32 generates an error value $E_{sn-1}$ which is provided to first adder 12.

The above described error diffusion method is a nonlinear process, which is limited to white and black, and has different points in the edge enhancement of pixels as compared to a linear filter. In the error diffusion method described above, many problems exist. These problems are identified below as numerals (1) through (3).

(1) Edge enhancement must be dependent on the brightness difference of an input pixel. In the prior art binary-encoding method, however, edge enhancement is dependent on a modified brightness value $I_c(x,y)$ in addition to the brightness difference. Therefore, the method does not provide excellent edge enhancements.

(2) In the binary-encoding method of FIG. 2, no edge enhancement can be performed at a brightness value of black (0) or white (255). Also, edge enhancement can not be sufficiently performed even in the vicinity of the brightness values corresponding to black or white. As a result, good image quality can not be obtained on a screen.

(3) Finally, if the edge enhancement coefficient K is high (i.e. more than about five), bars that are unpleasant to the eye are frequently displayed on the screen. Also, if the coefficient K is reduced to suppress the bars, the amount of edge enhancement is also reduced. As a result, good image quality cannot be obtained on the screen.

Figure 3:
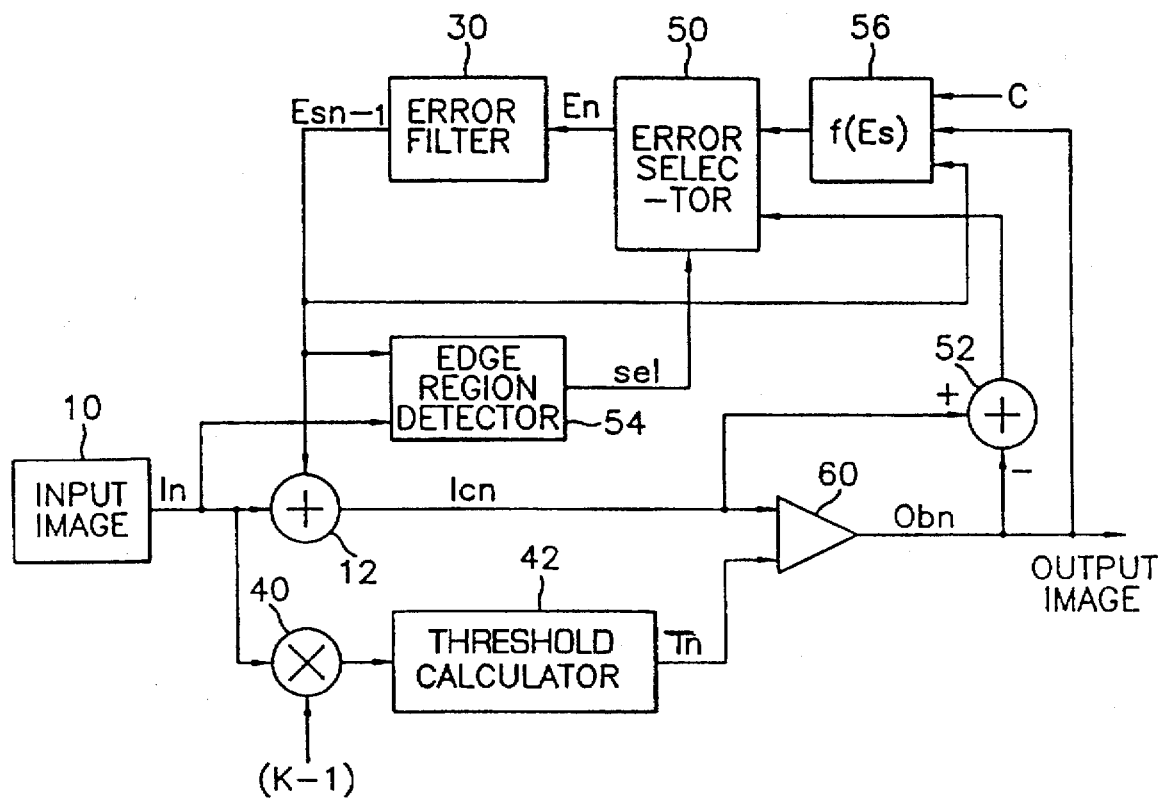
FIG. 3 is a block diagram illustrating a circuit constructed for performing a method of binary-encoding image data using an error diffusion algorithm with edge enhancement in accordance with the principles of the present invention.

Referring now to FIG. 3, a block diagram illustrating a circuit for performing a method of binary-encoding image data using an error diffusion algorithm with edge enhancement in accordance with the principles of the present invention is shown. In the construction of the circuit shown in FIG. 3, the same components as those in FIG. 2 are indicated by the same reference numerals, and a description of those components is omitted.

In FIG. 3, a first adder 12 receives a brightness value $I_n$ of the input pixel n from input image block 10 and an error value $E_{m-1}$ obtained from a previous processing step, and adds the two values, where n represents the input pixel number. Modified image data $I_{cn}$ representing an error diffusion value is provided from first adder 12 and applied to an input of a comparator 60. A threshold modifier 40 multiplies the brightness value $I_n$ by a predetermined coefficient value (K–1) to generate a modified brightness value $I_n(K-1)$. The modified brightness value $I_n(K-1)$ is then applied to a threshold calculator 42. Threshold calculator 42 subtracts the modified brightness value $I_n(K-1)$ from a constant threshold value $T_0$ to generate a modified threshold value $T_n$. The modified threshold value $T_n$ is then provided to the other input of comparator 60.

The modified image data $I_{cn}$ and the modified threshold value $T_n$ are compared in comparator 60. If $I_{cn}$ is greater than $T_n$, a binary-encoded value $O_{bn}$ of logic level "1" is provided from comparator 60, and if $I_{cn}$ is not greater than $T_n$, the binary-encoded value $O_{bn}$ of logic level "0" is provided from comparator 60.

Figure 8:
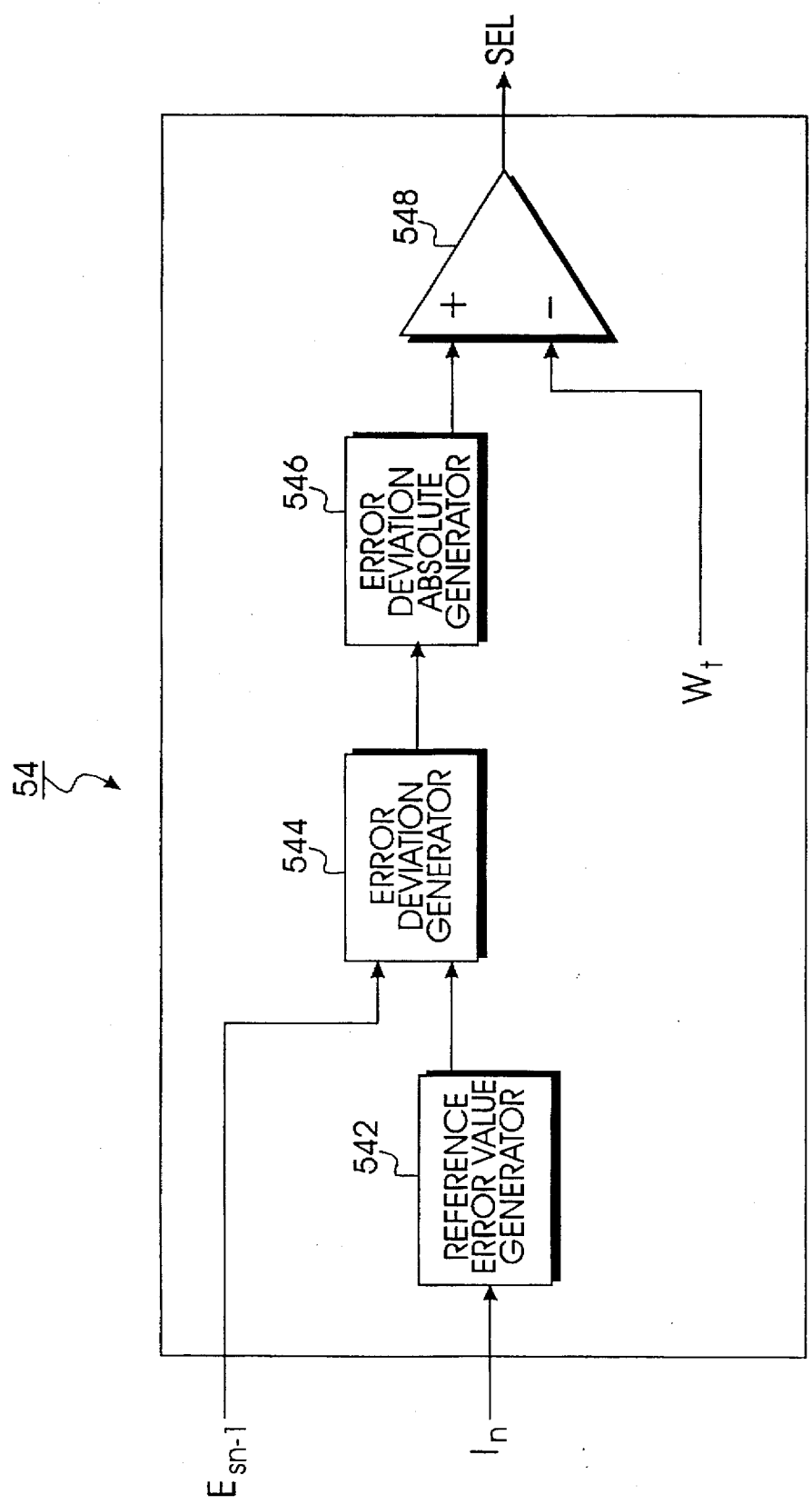
FIG. 8 is a block diagram illustrating an implementation of the edge region detector 54 shown in FIG. 3.

Edge region detector 54 may be implemented as shown in FIG. 8. In FIG. 8, reference error value generator 542 receives brightness value $I_n$ and performs calculations for providing a reference error value based on brightness value $I_n$. Error deviation generator 544 receives an error value $E_{sn-1}$ and receives the reference error value provided by reference error value generator 542 and calculates therefrom an error deviation. Error deviation absolute generator 546 receives the error deviation from error deviation generator 544 and produces therefrom an error deviation absolute value. A comparator 548 receives the error deviation absolute value, compares it to a value corresponding to a predetermined error width $W_L$, and provides a selection signal sel in accordance therewith. Selection signal sel indicates that the input pixel n corresponds to an edge region when the error deviation absolute value is greater than $W_L$. Selection signal sel indicates that the input pixel n does not corresponds to an edge region when the error deviation absolute value is not greater than $W_L$.

The binary-encoded value $O_{bn}$ is subtracted from the modified image data $I_{cn}$ in a subtractor 52, and an output signal from subtractor 52 is provided to error selector 50.

Figure 7:
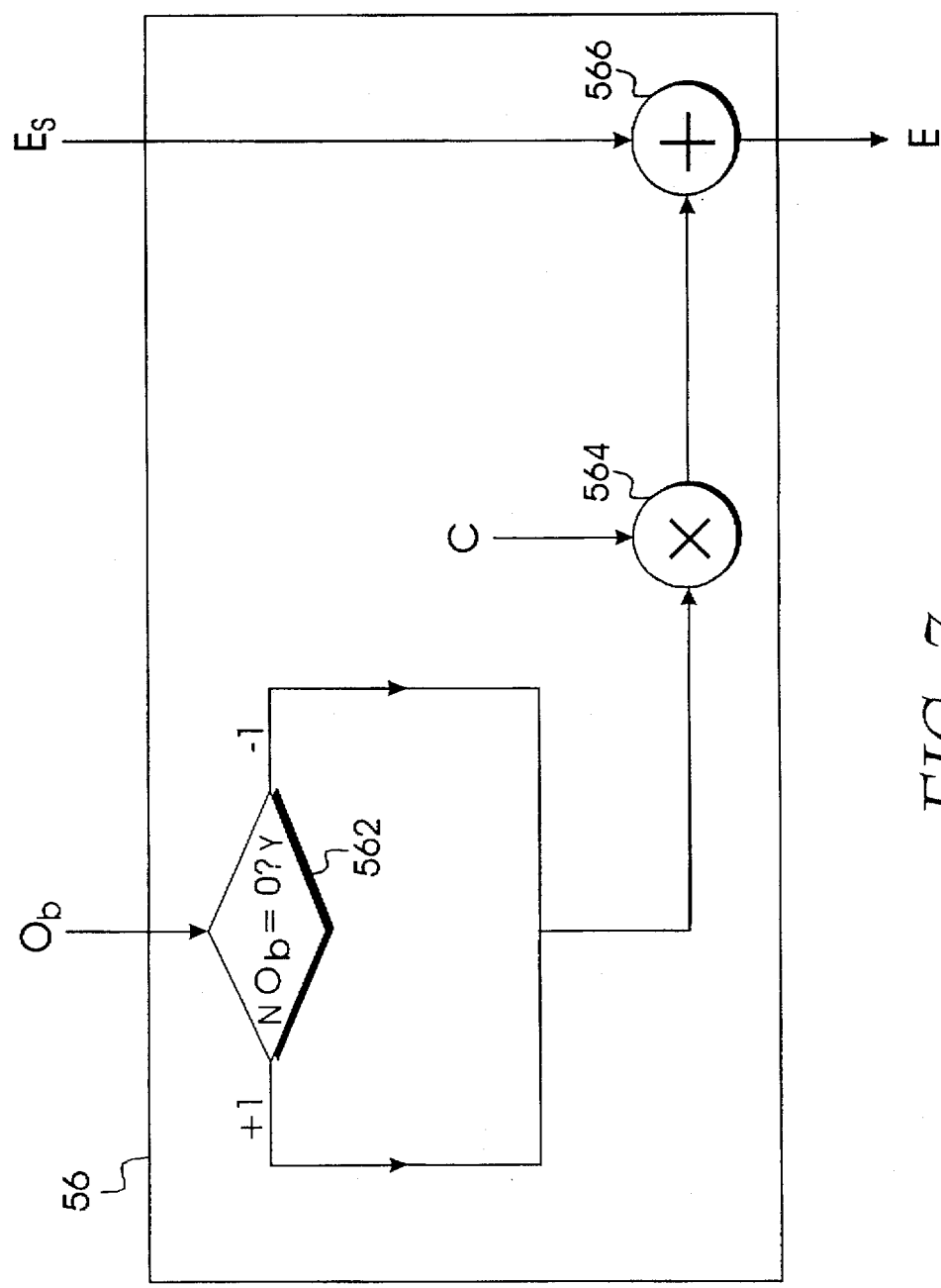
FIG. 7 is a block diagram illustrating an implementation of the error calculator 56 shown in FIG. 3.

Error calculator 56 may be implemented as shown in FIG. 7. Comparator 562 receives binary-encoded value $O_{bn}$ (which takes on values for black or white, e.g., 0 or 255, respectively) and compares $O_{bn}$ to zero. Comparator 562 then provides an output value equal to +1 if $O_{bn} \neq 0$, and it provides a value equal to –1 if $O_{bn}=0$. Multiplier 564 receives the output value from comparator 562 and multiplies it by a predetermined error parameter C to provide a multiplied value. Adder 566 receives the multiplied value and $E_s$ and adds them to produce an error value E which is provided to error selector 50. Error selector 50 receives the output signals from subtractor 52 and error calculator 56 and selects one of the output signals in response to selecting signal sel. Then, the signal selected by error selector 50 is used as an error value $E_n$ of the input pixel n, and is provided to an error filter 30.

Error filter 30, in which error values $E_{n-1}, E_{n-2}, \ldots, E_0$ of previously processed pixels are stored, multiplies the error values $E_n, E_{n-1}, E_{n-2}, \ldots, E_0$ by the corresponding filter coefficients to generate multiplied values, and then sums the multiplied values. For example, error filter 30 stores the error value $E_{n-1}$ of the previously processed pixel (n–1) adjacent to pixel n, multiplies all of the error values by the respective corresponding coefficients to generate multiplied values, and adds the multiplied values to generate the error value $E_{sn}$ for a next binary-encoding step. As a result, an error value $E_{sn}$ to be processed in a next binary-encoding step is provided from error filter 30. In this embodiment, a desirable constant or a variable relating to the error value can be used as error constant C.

Figure 4B:
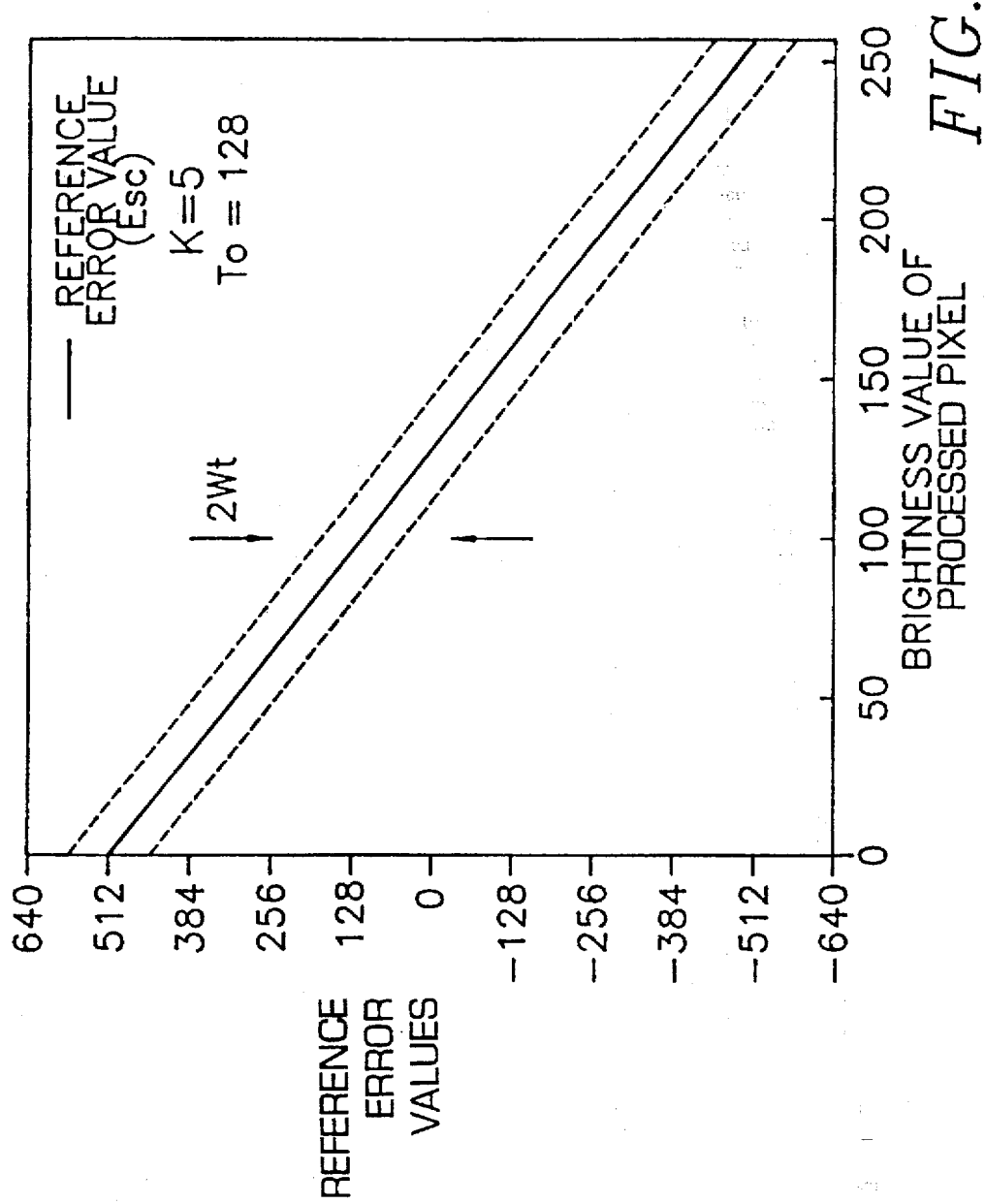

Referring now to FIGS. 4A and 4B, diagrams illustrating the boundary state in which the pixels of an image are divided into a normal region and an edge region by a boundary line are shown.

Using the error diffusion algorithm according to the first embodiment of the present invention, an error value can be obtained for diffusion of the brightness value of a processed pixel to be provided for binary-encoding, and the brightness values of pixels adjacent to the processed pixel, as in the expression (1).

If the input error value of $I(x,y)$ is $E_s(x,y)$ in the expressions (3) and (4), the following expression (7) can be obtained:

$$E_s(x,y) = \frac{\sum\limits_{ij} a_{ij}E(x - i\Delta x, y - j\Delta y)}{\sum\limits_{ij} a_{ij}} \quad (7)$$

Modified image data is obtained on the basis of the addition of the error value $E_s(x,y)$ and the brightness value of the processed pixel, and thereafter the modified image data is binary-encoded. Then, the range of the error value can be obtained from the expressions (1) to (6). When the encoded image is evenly distributed, the range is capable of approximating the brightness values of the pixels.

In the Eschbach algorithm as applied in the present invention, if the range of the error E is determined in the evenly distributed regions, the modified threshold value $T_n$ according to the present invention becomes $T_0-I_n(K-1)$. Thus, the range can be expressed by the following expression (8-1):

$$T_0-255-(K-1)\times I < E < T_0-(K-1)\times I \qquad (8\text{-}1)$$

Because the error value $E_s$ is an average error value of the pixel presently being processed or an adjacent pixel, it has the same range E of error, and can be obtained from the following expression (8-2):

$$T_0-255-(K-1)\times I < E_s < T_0-(K-1)\times I \qquad (8\text{-}2)$$

From the expression (8-2), it can be deduced that the range of the error value changes in accordance with the brightness value of the processed pixel. Therefore, it can be understood that in the Eschbach algorithm the brightness of the processed pixel approximates a specific value in normal regions other than edge regions.

In the Eschbach algorithm, the even region has the range of error values which is expressed by expression (8-2). When a brightness value is varied in the edge boundary, points in vicinity of the edge boundary are continuously displayed as black or white. Then, a line for demarking edge region pixels is formed and the distribution of error values is suitable for approximating a new brightness value.

If the brightness value of the processed pixel is I, the magnitude of the error value which can be applied during binary-encoding is obtained by the following expression (9):

$$E=I_c-O_b=E_a+(I-O_b) \qquad (9)$$

In expression (9), the quantity $(I-O_b)$ can be regarded as the magnitude of the error value. The magnitude varies in accordance with the brightness value of the processed pixel. For example, the magnitude of the error value becomes zero when the non-binary-encoded value is zero or two hundred fifty-five. Even when in the vicinity of the value of zero or two hundred fifty-five, the magnitude is extremely low. To reduce the magnitude of error values implies to progressively exclude a number of pixels from the normal regions. This also means that the line for emphasizing edge components becomes thicker. Since it is already observed that the distribution of error values is close to appropriate brightness in the edge region, points in the non-edge region and points in regions other than the edge region can be distinguished. For a description of this distinction, two coefficients have to be defined. Since the range of distribution is linear in accordance with the brightness value of a pixel, as seen from expression (8-2), an intermediate value $E_{sc}$ as one of the two coefficients is expressed by the following expression (10):

$$E_{sc} = T_0 - (K-1) \times I - \frac{255}{2} \qquad (10)$$

The intermediate value $E_{sc}$ can be expressed as shown in FIG. 4A. In FIG. 4A, the edge enhancement coefficient K is shown as being equal to five. In expression (8-2), the error value $E_s$ varies linearly in accordance with the brightness value of the pixel, but an axis of symmetry is changed in accordance with the edge enhancement coefficient.

For example, as shown in FIG. 4A, the error value $E_s$ is symmetrical with respect to a value of $-512$, but asymmetrical with respect to a value of zero.

Hereinafter, the method according to another embodiment of the present invention will be described.

In this embodiment, the calculation of the modified threshold value $T_n$ is different from that of the modified threshold value according to the first embodiment. The new modified threshold value $T_n$ is calculated so that the magnitude of the error value is symmetrical with respect to a value of zero, and can be calculated by the following expression (11):

$$T_n = KT_0 - (K-1)\times I(x,y) \qquad (11)$$

From the above expressions (1) through (4), (6) and (11), the range of error value $E_s$ can be obtained by the following expression (12):

$$KT_0-(K-1)\times I-255 < E_s < KT_0-(K-1)\times I \qquad (12)$$

The range of error values expressed in expression (12) is linear in accordance with the brightness value, and the intermediate value can be obtained by the following expression (13):

$$E_{sc}=(K-1)\times(T_0-1) \qquad (13)$$

In the case that the new modified threshold value $T_n$ is applied, the range of error values is symmetrical with respect to a value of zero, as shown in FIG. 4B. Thus, the hardware construction for the new modified threshold value is simplified, as compared to the hardware construction for the modified threshold value of the Eschbach algorithm.

As shown in FIGS. 4A and 4B, points on the boundary line, which is indicated by a solid line, are regarded as intermediate values in which error value $E_s$ is distributed at a given brightness. The intermediate value is also referred to as "reference error value $E_{sc}$" at a given brightness. Suppose that a difference between the error value $E_s$ and the reference error value $E_{sc}$ is an error deviation W. If the brightness value of a pixel is determined, the reference error value can be determined. As a result, the error range can be obtained by the calculation of the reference error value $E_{sc}$ and the diffused error value. Therefore, it can be estimated that the error difference is an extremely low value.

If a threshold value for the error difference is established, it can be used to distinguish whether pixels are in an edge region or in a region other than an edge region. In this case the threshold value of the error difference is referred to as a "normal error difference width $W_t$".

In the above described method for identifying edge characteristics of a processed pixel, when the error value which is within a range of $\pm W_t$ from the reference error value is produced, it is determined that the pixel corresponds to a normal (i.e. non-edge) region. Thus, in the normal region, a difference between the modified image data and the binary-encoded value is defined as an error E on the basis of FIGS. 4A and 4B.

When the error value $E_s$ deviates more than $\pm W_t$ from the reference error value, it is determined that the pixel corresponds to an edge region. Thus, in the edge region, the calculation of error is performed to increase or decrease $E_s$ by a predetermined amount. The calculation is performed with the following error difference calculation expression (14).

$$E(x,y) = \begin{pmatrix} E_s(x,y) + C, \text{ when } O_b = 255(\text{white}) \\ E_s(x,y) - C, \text{ when } O_b = 0(\text{black}) \end{pmatrix} \qquad (14)$$

In expression (14), the new error value is calculated. Like the Eschbach algorithm, the output corresponding to an edge region is maintained in an even state, to which the error value is applied. However, since the magnitude of the error value is constant at one binary-encoding step in the above described algorithm of the second embodiment, a boundary emphasized by a bar having similar thickness is displayed when brightness values in the boundary are equal.

The binary-encoding methods according to the embodiments of the present invention will now be described with reference to FIGS. 3 and 4.

Turning again to FIG. 3, first adder 12 receives a brightness value $I_n$ corresponding to input pixel n provided from input image block 10 and an error value $E_{sn-1}$ obtained from a previous processing step, and adds the two values. Then, modified image data $I_{cn}$ is output from first adder 12 and provided to comparator 60. Threshold modifier 40 multiplies brightness value $I_n$ by a predetermined coefficient value K−1 to generate a modified brightness value $I_n(K-1)$. The modified brightness value $I_n(K-1)$ is then provided to threshold calculator 42. According to the first embodiment of the present invention, threshold calculator 42 subtracts modified brightness value $I_n(K-1)$ from a predetermined threshold value $T_0$ to generate a modified threshold value (i.e. $T_n=T_0-I_n(K-1)$).

According to the second embodiment of the present invention, threshold calculator 42 subtracts modified brightness value $I_n(K-1)$ from a predetermined threshold value $KT_0$ to generate a modified threshold value $T_n=KT_0-I_n(K-1)$. The modified threshold value $T_n$ is provided to the other input of comparator 60.

The modified image data $I_{cn}$ and the modified threshold value $T_n$ are compared in comparator 60. If $I_{cn}$ is greater than $T_n$, a binary-encoded value $O_{bn}$ of logic level "1" is provided from comparator 60, and if $I_{cn}$ is not greater than $T_n$, the binary-encoded value $O_{bn}$ of logic level "0" is provided from comparator 60.

Edge region detector 54, which receives brightness value $I_n$ of the input pixel n and an error value $E_{sn-1}$ of the pixel (n−1), performs the calculations for providing a reference error value on the basis of the brightness value $I_n$, provides an error deviation of the error value $E_{sn-1}$ from the reference error value, and performs a comparison of the error deviation with a predetermined error width $W_r$ to provide a selecting signal sel to an error selector 50. Selecting signal sel indicates whether pixel n corresponds to an edge region.

The binary-encoded value $O_{bn}$ is subtracted from the modified image data $I_{cn}$ in a subtractor 52, and an output signal from subtractor 52 is provided to error selector 50.

An error calculator 56 receives error value $E_{sn-1}$ and binary-encoded value $O_{bn}$, and adds or subtracts the predetermined error parameter C to or from the error value $E_{sn-1}$ in accordance with binary-encoded value $O_{bn}$. Error selector 50 receives the output signals from subtractor 52 and error calculator 56 and selects one of the output signals in response to selecting signal sel. Then, the signal selected by error selector 50 is used as an error value $E_n$ of the input pixel n, and is provided to an error filter 30.

Error filter 30, in which error values $E_{n-1}, E_{n-2}, \ldots, E_0$ of previously processed pixels are stored, multiplies the error values $E_n, E_{n-1}, E_{n-2}, \ldots, E_0$ by corresponding filter coefficients to generate multiplied values, and adds the multiplied values. As a result, an error value $E_{sn}$ to be processed in the next binary-encoding step is provided from error filter 30.

Figure 5:
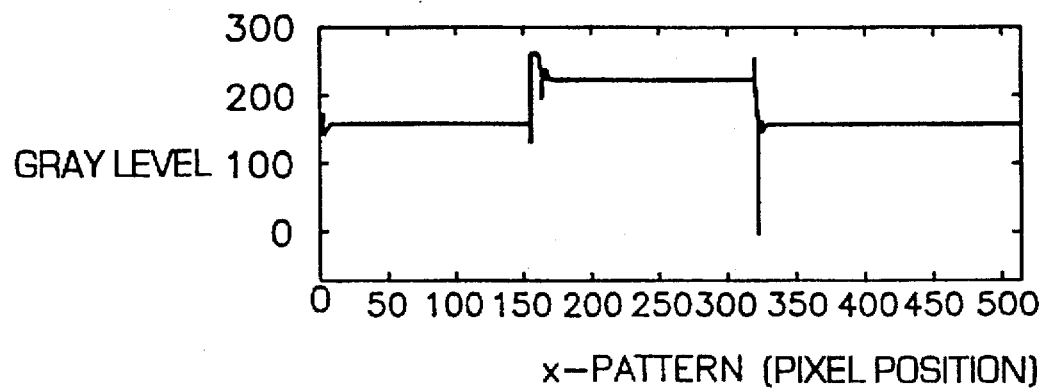
FIG. 5 is a graph showing the edge enhancement effect obtained by the contemporary binary-encoding method illustrated in conjunction with FIG. 1.
Figure 6:
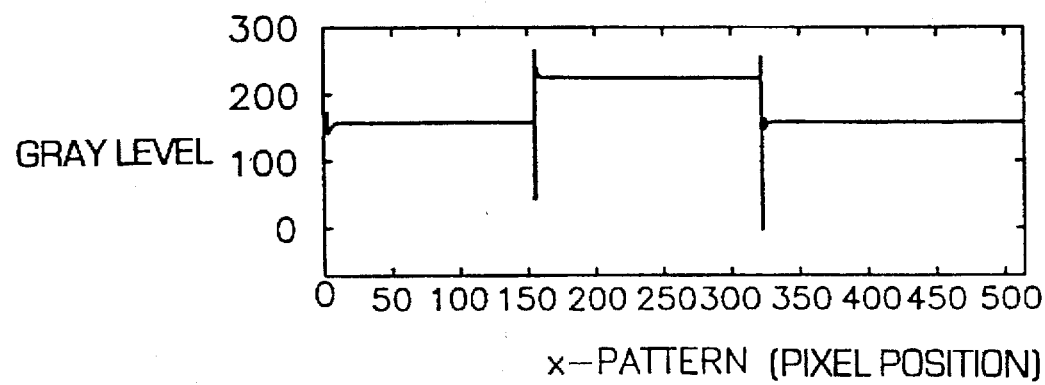
FIG. 6 is a graph showing the edge enhancement effect obtained by the binary-encoding method of the present invention.

Referring now FIGS. 5 and 6, FIG. 5 shows an edge enhancement effect according to the Eschbach algorithm, and FIG. 6 shows an edge enhancement effect according to the first embodiment of the present invention.

FIGS. 5 and 6 show how the brightness value of a processed pixel varies when the edge enhancement coefficient K=6, error width $W_f=140$, and error parameter C=200. In FIGS. 5 and 6, the width of the edge profile is determined by the brightness difference between two edge regions, and dependency on the brightness value is sufficiently reduced. As a result, excellent edge sharpness for a continuously input image can be obtained.

According to the present invention, an error calculation is performed in which an error value and a brightness value of the processed pixel are compared with each other and the edge sharpness of the input image is accommodated. As a result, edge enhancement can be improved as compared to the conventional binary-encoding method. Furthermore, with the binary-encoding method of the present invention, a high degree of linearity for edge characteristics can be obtained. The edge enhancement can be obtained even at black or white levels, and the occurrence of bars on the screen that are unpleasant to the eye can be reduced.

Also, since the calculation of the threshold value in the Eschbach algorithm is improved upon by the present invention, the hardware construction can be simplified as compared to conventional binary-encoding methods.

It is understood that various other modifications will be apparent to and can be readily made by those skilled in the art without departing from the central scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In an image processing system for binary-encoding image data representative of a plurality of pixels, each pixel having a brightness value corresponding to a given level, said system having a memory for storing error values of previously processed pixels, a method for binary-encoding said image data comprising the steps of:

generating multiplied values by multiplying said error values stored in said memory by corresponding error filter coefficients, respectively;

generating an error value corresponding to a most recently processed pixel by adding said multiplied values;

generating modified image data by adding a brightness value of a pixel presently being processed to said error value corresponding to said most recently processed pixel;

generating a modified brightness value corresponding to a predetermined edge enhancement coefficient based on said brightness value of said pixel presently being processed;

generating a modified threshold value by subtracting said modified brightness value from a predetermined reference threshold value;

generating a binary-encoded value corresponding to said pixel presently being processed by comparing a value representative of said modified image data with said modified threshold value;

determining whether said pixel presently being processed corresponds to an edge region in dependence upon said brightness value of said pixel presently being processed and said error value corresponding to said most recently processed pixel;

generating a subtracted value by subtracting said binary-encoded value from said value representative of said modified image data, and storing said subtracted value in said memory as an error value corresponding to said pixel presently being processed when said pixel presently being processed does not correspond to said edge region; and generating an error result in dependence upon said binary-encoded value by one of adding a predetermined error parameter to said error value corresponding to said most recently processed pixel and subtracting said predetermined error parameter from said error value corresponding to said most recently processed pixel, and storing said error result in said memory as said error value corresponding to said pixel presently being processed when said pixel presently being processed corresponds to said edge region.

2. The method as defined in claim 1, wherein said modified threshold value is represented as $T_n$ in the following expression:

$$T_n = T_0 - (K-1) \times I$$

where $T_0$ represents said predetermined reference threshold value, K represents said predetermined edge enhancement coefficient, and I represents said brightness value of said pixel presently being processed.

3. The method as defined in claim 2, wherein said step of determining whether said pixel presently being processed corresponds to said edge region further comprises:

generating a reference error value in dependence upon said brightness value of said pixel presently being processed;

generating an error deviation of said error value corresponding to said most recently processed pixel in dependence upon said reference error value;

generating an absolute value of said error deviation;

determining that said pixel presently being processed corresponds to said edge region when said absolute value of said error deviation is greater than an absolute value of a predetermined error range; and determining that said pixel presently being processed does not correspond to said edge region when said absolute value of said error deviation is less than said absolute value of said predetermined error range.

4. The method as defined in claim 3, wherein said reference error value is generated according to the following expression:

$$E_{sc} = T_0 - (K-1) \times I - \frac{I_{max} - I_{min}}{2}$$

where $E_{sc}$ represents said reference error value, $I_{max}$ represents a maximum brightness value available for said plurality of pixels; and $I_{min}$ represents a minimum brightness value available for said plurality of pixels.

5. The method as defined in claim 4, wherein said step of generating said error result is performed in accordance with the following expressions:

$$E_n = \begin{pmatrix} E_{n-1} + C, \text{ when } O_{bn} = I_{max} \\ E_{n-1} - C, \text{ when } O_{bn} = I_{min} \end{pmatrix}$$

where $E_n$ represents said error result, $E_{n-1}$ represents said error value corresponding to said most recently processed pixel, C represents said predetermined error parameter and $O_{bn}$ represents said binary-encoded value corresponding to said pixel presently being processed.

6. The method as defined in claim 5, wherein said predetermined error coefficient comprises a variable relating to said error values.

7. In an image processing system for binary-encoding image information representative of a plurality of pixels, each pixel having a brightness value corresponding to a given level, said system having a memory for storing error values of previously processed pixels, a method for binary-encoding said image data comprising the steps of:

generating multiplied values by multiplying said error values stored in said memory by corresponding error filter coefficients, respectively;

generating an error value corresponding to a most recently processed pixel by adding said multiplied values;

generating modified image data by adding a brightness value of a pixel presently being processed to said error value corresponding to said most recently processed pixel;

generating a modified brightness value based on a predetermined edge enhancement coefficient and said brightness value of said pixel presently being processed;

generating a first threshold value by multiplying a predetermined reference threshold value by said predetermined edge enhancement coefficient;

generating a modified threshold value by subtracting said modified brightness value from said first threshold value;

generating a binary-encoded value for said pixel presently being processed by comparing a value representative of said modified image data with said modified threshold value;

determining whether said pixel presently being processed corresponds to an edge region in dependence upon said brightness value of said pixel presently being processed and said error value corresponding to said most recently processed pixel;

generating a subtracted value by subtracting said binary-encoded value from said value representative of said modified image data, and storing said subtracted value in said memory as an error value corresponding to said pixel presently being processed when said pixel presently being processed does not correspond to said edge region; and generating an error result in dependence upon said binary-encoded value by one of adding a predetermined error parameter to said error value corresponding to said most recently processed pixel and subtracting said predetermined error parameter from said error value corresponding to said most recently processed pixel, and storing said error result in said memory as said error value corresponding to said pixel presently being processed when said pixel presently being processed corresponds to said edge region.

8. The method as defined in claim 7, wherein said modified threshold value is represented as $T_n$ in the following expression:

$$T_n = T_0 K - (K-1) \times I$$

where $T_0$ represents said predetermined reference threshold value, K represents said predetermined edge enhancement coefficient, and I represents said brightness value of said pixel presently being processed.

9. The method as defined in claim 8, wherein said step of determining whether said pixel presently being processed corresponds to said edge region further comprises:

generating a reference error value in dependence upon said brightness value of said pixel presently being processed;

generating an error deviation of said error value corresponding to said most recently processed pixel in dependence upon said reference error value;

generating an absolute value of said error deviation;

determining that said pixel presently being processed corresponds to said edge region when said absolute value of said error deviation is greater than an absolute value of a predetermined error range; and determining that said pixel presently being processed does not correspond to said edge region when said absolute value of said error deviation is less than absolute value of said predetermined error range.

10. The method as defined in claim 9, wherein said reference error value is represented as $E_{sc}$ in the following expression:

$$E_{sc} = (K-1) \times (T_0 - 1).$$

11. The method as defined in claim 10, wherein said step of generating said error result is performed in accordance with the following expressions:

$$E_n = \begin{pmatrix} E_{n-1} + C, \text{ when } O_{bn} = I_{max} \\ E_{n-1} - C, \text{ when } O_{bn} = I_{min} \end{pmatrix}$$

where $E_n$ represents said error result, $E_{n-1}$ represents said error value corresponding to said most recently processed pixel, C represents said predetermined error parameter and $O_{bn}$ represents said binary-encoded value corresponding to said pixel presently being processed.

12. An image processing apparatus using an error diffusion method, said apparatus comprising:

means for storing error values corresponding to previously processed pixels, multiplying said error values by corresponding error filter coefficients, respectively, to generate multiplied values, and generating an error value corresponding to a most recently processed pixel by adding said multiplied values;

means for adding a brightness value of a pixel presently being processed to said error value corresponding to said most recently processed pixel to generate an added value as modified image data;

means for generating a modified brightness value in dependence upon said brightness value of said pixel presently being processed and a predetermined edge enhancement coefficient;

first calculating means for subtracting said modified brightness value from a reference threshold value to generate a modified threshold value;

comparing means for comparing said added value with said modified threshold value to generate a binary-encoded value corresponding to said pixel presently being processed;

edge region detecting means for generating a reference error value based on said brightness value of said pixel presently being processed, generating an error deviation of said error value corresponding to said most recently processed pixel based on said reference error value, and comparing said error deviation with a value representative of a predetermined error range to generate a selecting signal indicating whether said pixel presently being processed corresponds to an edge region;

means for generating a first output signal by subtracting said binary-encoded value from said added value;

second calculating means for generating a second output signal by one of adding a predetermined error parameter to said error value corresponding to said most recently processed pixel and subtracting said predetermined error parameter from said error value corresponding to said most recently processed pixel in dependence upon said binary-encoded value; and error selecting means for selecting one of said first output signal and said second output signal as an error value corresponding to said pixel presently being processed in response to said selecting signal.

13. The apparatus as defined in claim 12, wherein said modified brightness value is represented as $I_{mod}$ in the following expression:

$$I_{mod} = (K-1) \times I$$

where K represents said predetermined edge enhancement coefficient and I represents said brightness value of said pixel presently being processed.

14. The apparatus as defined in claim 13, wherein said modified threshold value is represented as $T_n$ in the following expression:

$$T_n = T_0 - (K-1) \times I$$

where $T_0$ represents said predetermined reference threshold value, K represents said predetermined edge enhancement coefficient, and I represents said brightness value of said pixel presently being processed.

15. The apparatus as defined in claim 14, wherein said reference error value is generated according to the following expression:

$$E_{sc} = T_0 - (K-1) \times I - \frac{I_{max} - I_{min}}{2}$$

where $E_{sc}$ represents said reference error value, $I_{max}$ represents a maximum brightness value available for said plurality of pixels, and $I_{min}$ represents a minimum brightness value available for said plurality of pixels.

16. The apparatus as defined in claim 12, wherein said second output signal is generated in accordance with the following expressions:

$$E_n = \begin{pmatrix} E_{n-1} + C, \text{ when } O_{bn} = I_{max} \\ E_{n-1} - C, \text{ when } O_{bn} = I_{min} \end{pmatrix}$$

where $E_n$ represents said error result, $E_{n-1}$ represents said error value corresponding to said most recently processed pixel, C represents said predetermined error parameter and $O_{bn}$ represents said binary-encoded value corresponding to said pixel presently being processed.

17. The apparatus as defined in claim 15, wherein said second output signal is generated in accordance with the following expressions:

$$E_n = \begin{pmatrix} E_{n-1} + C, \text{ when } O_{bn} = I_{max} \\ E_{n-1} - C, \text{ when } O_{bn} = I_{min} \end{pmatrix}$$

where $E_n$ represents said error result, $E_{n-1}$ represents said error value corresponding to said most recently processed pixel, C represents said predetermined error parameter and $O_{bn}$ represents said binary-encoded value corresponding to said pixel presently being processed.

18. An image processing apparatus using an error diffusion method, said apparatus comprising:

means for storing error values corresponding to previously processed pixels, multiplying said error values by corresponding error filter coefficients, respectively, to generate multiplied values, and generating an error value corresponding to a most recently processed pixel by adding said multiplied values;

means for generating an added value as modified image data by adding a brightness value of a pixel presently being processed to said error value corresponding to said most recently processed pixel;

means for generating a modified brightness value in dependence upon said brightness value of said pixel presently being processed and a predetermined edge enhancement coefficient;

first calculating means for receiving said modified brightness value and generating a modified threshold value equal to $KT_o-(K-1)\times I$, where $T_o$ represents a reference threshold value, K represents said predetermined edge enhancement coefficient, and I represents said brightness value of said pixel presently being processed;

comparing means for comparing said added value with said modified threshold value to generate a binary-encoded value corresponding to said pixel presently being processed;

edge region detecting means for generating a reference error value based on said brightness value of said pixel presently being processed, generating an error deviation of said error value corresponding to said most recently processed pixel based on said reference error value, and comparing said error deviation with a value representative of a predetermined error range to generate a selecting signal indicating whether said pixel presently being processed corresponds to an edge region;

means for generating a first output signal by subtracting said binary-encoded value from said added value;

second calculating means for generating a second output signal by one of adding a predetermined error parameter to said error value corresponding to said most recently processed pixel and subtracting said predetermined error parameter from said error value corresponding to said most recently processed pixel in dependence upon said binary-encoded value; and error selecting means for selecting one of said first output signal and said second output signal as an error value corresponding to said pixel presently being processed in response to said selecting signal.

19. The apparatus as defined in claim 18, wherein said reference error value is represented as $E_{sc}$ in the following expression:

$$E_{sc}=(K-1)\times(T_0-I).$$

20. The apparatus as defined in claim 18, wherein said second output signal is generated in accordance with the following expressions:

$$E_n = \left( \begin{array}{l} E_{n-1}+C, \text{when } O_{bn}=I_{max} \\ E_{n-1}-C, \text{when } O_{bn}=I_{min} \end{array} \right)$$

where $E_n$ represents said error result, $E_{n-1}$ represents said error value corresponding to said most recently processed pixel, C represents said predetermined error parameter and $O_{bn}$ represents said binary-encoded value corresponding to said pixel presently being processed.

21. The apparatus as defined in claim 3, wherein said reference error value is generated according to the following expression:

$$E_{sc}=T_0-(K-1)\times I-\frac{I_{max}-I_{min}}{2}$$

where $E_{sc}$ represents said reference error value, $I_{max}$ represents a maximum brightness value being displayed among said plurality of pixels, and $I_{min}$ represents a minimum brightness value being displayed among said plurality of pixels.

22. The apparatus as defined in claim 14, wherein said reference error value is generated according to the following expression:

$$E_{sc}=T_0-(K-1)\times I-\frac{I_{max}-I_{min}}{2}$$

where $E_{sc}$ represents said reference error value, $I_{max}$ represents a maximum brightness value being displayed among said plurality of pixels, and $I_{min}$ represents a minimum brightness value being displayed among said plurality of pixels.

* * * * *